Sept. 24, 1968
H. D. NOBLE
3,402,652
NEGATIVE PROGRAMMING SYSTEM FOR CONTINUOUS
ROLL FILM PRINTING
Filed Oct. 15, 1965
2 Sheets-Sheet 1
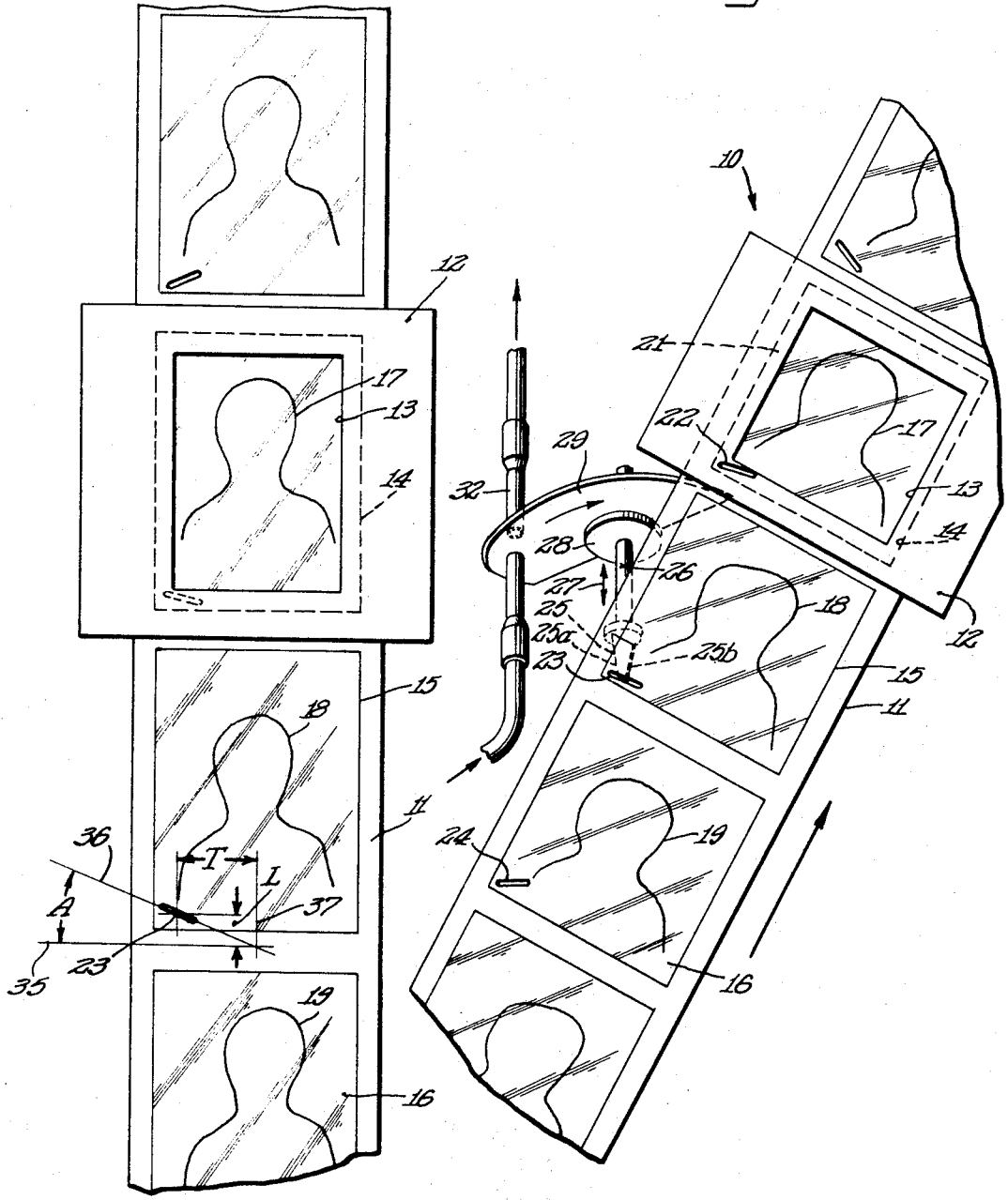
INVENTOR.
Haven Douglas Noble
BY
ATTORNEYS

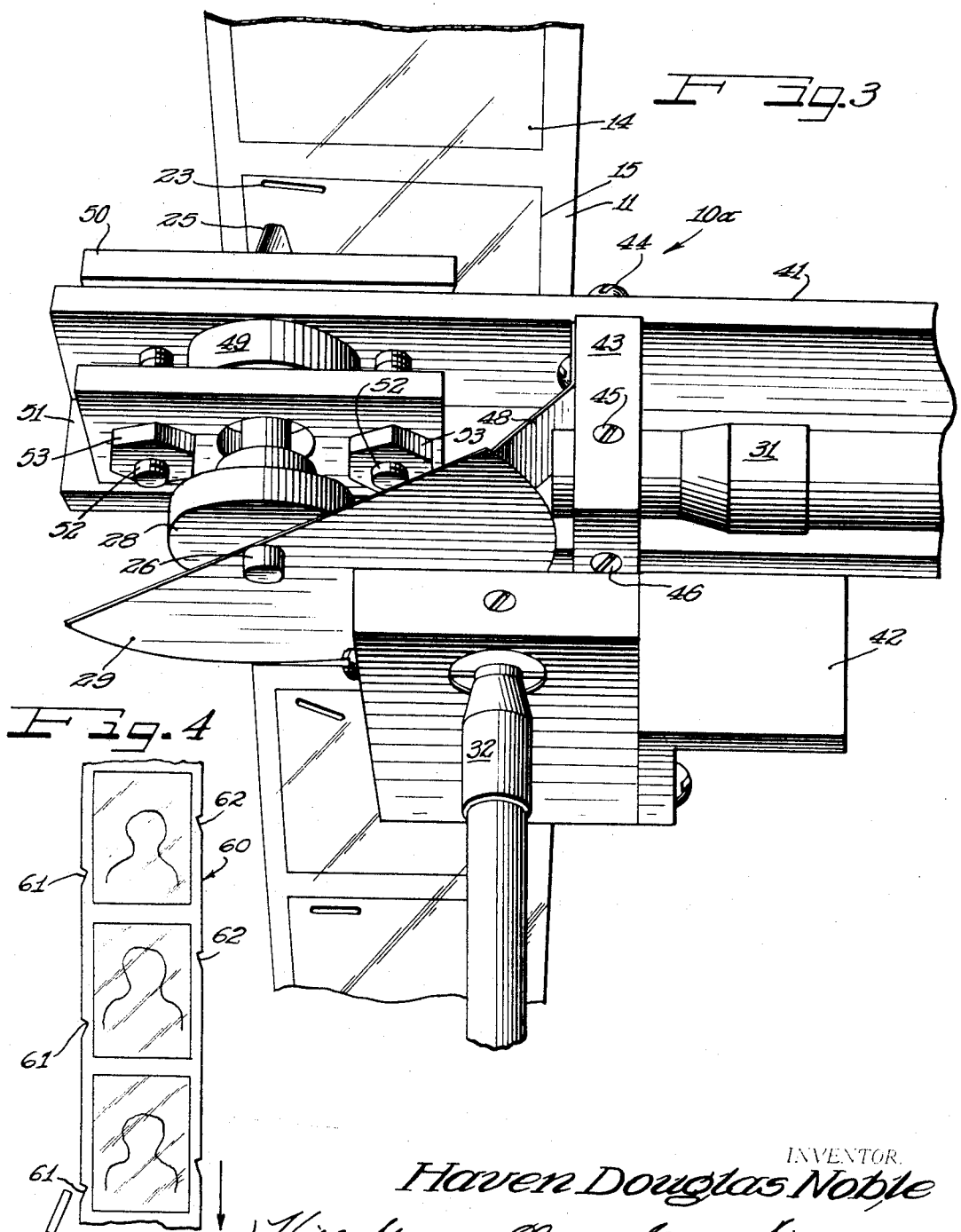

United States Patent Office 3,402,652
Patented Sept. 24, 1968

3,402,652
NEGATIVE PROGRAMMING SYSTEM FOR
CONTINUOUS ROLL FILM PRINTING
Haven D. Noble, 3225 Crestline Drive,
Davenport, Iowa 52803
Filed Oct. 15, 1965, Ser. No. 496,547
4 Claims. (Cl. 95—75)

ABSTRACT OF THE DISCLOSURE

A film negative programming system for roll film having a plurality of images thereon. The system includes apparatus for sensing the desired position and density of the film and placing a coated mark on the film in the region of each individual image. The mark is then used to accurately reposition the film and set the desired density controls to reproduce the film.

The present invention relates to improved photographic methods and improved articles for use in such methods and is specifically directed to a negative programming system for continuous roll film printing wherein the center of photographic subject matter which is on an incremental area of the continuous roll film is placed in precise alignment with the center of sensitized photographic paper and the amount of light necessary to develop each incremental area of the continuous roll film is automatically controlled by means of a pre-aligned sensing mark such as a slot which by its shape and angular position controls the applicable variables.

In modern low cost high volume portrait photography it becomes necessary to expose negatives on incremental areas of large continuous rolls of film. The rolls of film may consist of hundreds of incremental areas each representative of a negative and may be processed in a semi-automatic enlarger or printer.

Heretofore, an operator will place the first negative into a special frame or negative carrier and compose the image therein. That is, the operator places the center of the photographic subject matter of the film in alignment with the center of the image reproducing paper or the like.

Then, a specially designed photo cell is controlled by the operator to take a light reading from the central area of the photographic subject matter to determine the light density of the film at that area. The operation of taking a density reading is performed for each incremental area of film of the continuous roll of film. The operator will then actuate suitable control means to expose the negative to a small incremental area of a large roll of photosensitive paper and produce a photographic print. The time of exposure for making such a print may be between 5 and 15 seconds depending upon the density of the area of the negative which the photocell has sensed.

After exposure, the photosensitive paper automatically advances; however, the continuous roll film of negatives must be advanced to the next incremental area manually and the process described hereinabove repeated.

During the printing of a particular roll of film, it may be desired to obtain several different types of printed photographs therefrom, in which event, the steps of composing and reading of the light density of each incremental area of film must again be repeated. By way of example, an efficient operator can compose and read the negative in approximately two seconds, while the machine will require, approximately, six seconds to expose the film. This means that for approximately six hours of every eight hour working day an operator performs no useful task.

In accordance with this invention a negative programming system is provided wherein a roll of negatives contains a plurality of images which are composed and read only once by an operator. The information is recorded on the film by a coded mark such as a slot which by its shape and angularity controls the variables of an automatic readout mechanism associated with a printer, thereby facilitating automatic printing without necessitating the further attention of the operator.

It is therefore a primary object of the invention to decrease the amount of unproductive time spent by an operator when developing and printing continuous roll films.

Another object of the present invention is to provide means whereby the center of the photographic subject matter of a negative is automatically positioned at the center of the photographic paper.

Another object of the present invention is to provide means for determining the light density of the negative being reproduced and to automatically control the time of exposure of the negative to the light sensitive paper.

Still another object of the present invention is to provide an apparatus which can function either as a film programmer to place processing information of the film or as an automatic processing device.

A feature object of the present invention is that of providing a slot in the margin of a negative which corresponds to the position of the photographic subject matter associated with an adjacent negative on the continuous roll film.

Still another feature object of the present invention is to provide means whereby the angular displacement of a slot in the margin of a negative determines the amount of exposure time required to print a particular negative.

These and other objects and features of the invention will be more fully realized and understood from the following detail description when taken in conjunction with the accompanying drawings in which like reference numerals throughout the various views of the drawings designate similar elements.

On the drawings:

FIGURE 1 is a somewhat perspective view showing the apparatus of the present invention carried beneath a continuous length of film which may pass through a film printing device, FIGURE 2 is a plan view of a portion of a continuous roll of film passing through the reproducing area of a reproducing device, FIGURE 3 is a detail perspective drawing of the apparatus which is constructed in accordance with the principles of the invention, and FIGURE 4 illustrates an alternative form of film coding according to the invention.

As shown on the drawings:

Shown in FIGURE 1 is a negative programming system for continuous roll film printing and is designated generally by reference numeral 10. A portion of a continuous roll of film 11 passes beneath a plate 12 having a rectangular aperture 13 therein. The film 11 has a plurality of image areas or individual negatives 14, 15 and 16 which occupy successive incremental areas of the film 11. The photographic subject matter of each of the negatives 14–16 is represented by the fanciful silhouette of a person 17, 18 and 19, respectively. In the printing of such negatives 14–16 it is desired that the photographic subject matter be properly framed or composed, for example, by being positioned substantially in the center of the rectangular opening 13 of the plate 12. In so doing, the head and shoulders of the persons 17–19, for example, will be placed substantially at the center of each corresponding photographic print.

A marginal area 21 is normally provided between the image areas periphery of the aperture 13 and the periphery of the negative 14 and in accordance with this invention and coded sense mark is located in that marginal area 21 to permanently record for instant read-out the variable controlling factors necessary for a successful printing of the negative. While the coded sense mark could take various geometric shapes or different physical forms, the illustrative embodiment herein disclosed takes the form of an elongated slot 22 which is provided in the marginal area 21 of the negative 14. Also, a corresponding slot 23 is provided in the marginal area of the negative 15, while a corresponding slot 24 is provided in the marginal area of the negative 16. The slots 22–24 may be strategically placed on the film 11 in any manner so as not to interfere with the printing of the negative.

The slots 22, 23 and 24 are placed on the film 11 by a negative programmer which is manually operated. That is, the photographic subject matter 17 is placed within the area of the aperture 13 and longitudinally and laterally centered within the area. Also, a light meter reading is taken of the photographic subject matter 17 to determine the light density of the film associated therewith. A suitable slot cutting device or punch is then actuated to place the slot 23 in the marginal area of the negative 15. Assuming a longitudinal reference axis 35 and a transverse reference axis 37, the longitudinal and lateral displacement of the center of the slot indicates the proper alignment of the central area of the photographic subject matter 17 of the negative 14 relative to the selected reference axes, while the angular displacement of the slot 23 is indicative of the light density of the photographic subject matter 17 of the negative 14. For purposes of identification, the longitudinal spacing dimension is shown at L and the transverse spacing dimension at T.

By way of illustrative example, a roll of film having a plurality of negatives thereon is placed in the film programming apparatus. The longitudinal and lateral displacement of the cutter or punch is fixed in relation to the film carrier of the negative programming apparatus. However, the punch rotates with the shaft and both are shiftable perpendicular to the film 11. However, the cutter or punch may be rotated through an angle which is representative of the light density of the film being sensed, thereby disposing of the slot 23 at a corresponding angle A. It will be appreciated that due to natural variations of the height of different people that the face area of persons photographed may not be positioned at the central portion of a negative. Therefore, it becomes necessary while printing such off-center negatives to adjust the position of the negative to compensate for the off-center conditions.

When a negative with a low head is placed in a film carrier, the operator would position the film so that the negative of interest would be centrally located within a negative viewing area. This would put the head of the person photographed in the center of the carrier and, therefore, in the center of the photograph even though it is not in the center of the negative. After the negative has been properly positioned in the film carrier a light density reading is taken, and the slot 23 is cut or punched, or otherwise marked on or into the marginal area of the negative 15.

As seen in FIGURE 1, a sensor takes the form of a tapered sensing blade 25 carried by a shaft 26 which is placed beneath the film 11. The shaft 26 is axially shiftable as indicated by reference numeral 27. Connected to the shaft 26 is a collar 28 which is provided to receive a variable density filter 29. The variable density filter 29 extends radially outwardly of the shaft 26 and is rotatable therewith. The filter 29 extends between a light transmitting element 31 and a light receiving element 32. By way of example, in the illustrated embodiment of the present invention, the light transmitting element 31 and the light receiving element 32 may be flexible light guides which transmit light energy axially therethrough regardless of bends or curves in the light guide.

During the process of printing each of the negatives on the length of continuous roll film 11 the film passes through the negative read out apparatus of FIGURE 3. The utilization of the information represented by the slots 22, 23 and 24 is substantially a reverse operation of that of the programming operation. It will be understood that the apparatus can be used in a position inverted from that shown in FIGURE 3, thereby positioning the film beneath the read out mechanism.

In the illustrated embodiment of the present invention a sensing blade or spear probe 25 is provided which senses the position of the slots 22, 23 and 24.

During the printing or readout process of the printing apparatus the tapered sensing blade 25 is in slidable engagement with the surface of the film 11 as the film is pulled through the film carrier by suitable means such as a motor. Since the sensing blade 25 slides over the surface of the film 11 and is urged against the film surface, it will extend into the slot 23 thereby stopping forward movement of the film 11 through the film carrier and placing the center of the photographic subject matter 17 within the central area of the aperture 13. Furthermore, the angular displacement of the sensing blade 25 will assume the angular displacement of the slot 23 thereby rotating the variable density filter 29 between the light transmitter 31 and light receiver 32. The information derived by the light transmitter 31, light receiver 32 and the variable density filter 29 may be used to control suitable timing means which, in turn, controls the exposure time of each negative.

The sensing blade 25 has tapered ends 25a and 25b thereby giving the sensing blade 25 a spear shape. The spear shape of the sensing blade 25 registers the film to one side or the other depending on the position of the slot 23 in such a manner as to shift the length of film 11 laterally to center the photographic subject matter 17 within the aperture 13. The length of exposure time required for the printing of the photographic subject matter 17 is determined on the angle of the slot 23 and is developed in response to the amount of light passing through the variable density filter 29.

Summarizing, information indicative of the position of the subject 17 on the negative 14 is permanently recorded on the film 11 by a sense mark such as a hole in the shape of the slot 23 in the film 11 at the marginal area of the negative 15. Information indicative of the relative density of the negative 14 in the area of the subject 17 is permanently recorded on the film 11 by the angular displacement of the slot 23.

Therefore, the slot 23 is indicative of photographic parameters associated with the negative 14. Furthermore, the slot 23 is displaced on the negative 14, by way of example, one negative length so that the slot sensing blade cannot interfere with the photographic equipment necessary for making the prints.

After each negative on the film 11 is processed and a slot corresponding to the photographic parameters of each negative is placed on the film 11, the entire film can be automatically processed by using the slots placed therein for interpreting the photographic parameters as mentioned hereinabove.

Shown in FIGURE 3 is the detail construction of the slot sensing blade 25 of the film density sensing apparatus and is designated generally by reference numeral 10a. An L-shaped beam 41 may be pivotally secured to a film processing table to permit advance of the film. An L-shaped bracket 42 is secured to the beam 41 and extends therefrom as seen in FIGURE 3. A mounting block 43 is also secured to the beam 41 by a bolt 44. The light transmitting element 31 extends through the block 43 and is secured thereto by a pair of screws 45 and 46. Also secured to the mounting block 43 is a mirror 48 which is used for changing the direction of light energy emitted from the end of the light transmitting element 31. The angle of the mirror 48 with respect to the axis of the light transmitting element 31 may be adjusted so that the light energy may be reflected to impinge upon the end of the light receiving element 32.

The shaft 26 is journalled by a bearing 49 which is secured to the beam 41 between a pair of plates 50 and 51. The plates 50 and 51 are secured to the beam 41 by a pair of bolts 52 each having a nut 53 as seen in FIGURE 3. The variable density filter 29 is secured to the collar 28 carried on the shaft 26 in such a manner as to extend radially outwardly therefrom and interposed in the light beam between the light transmitter 31 and light receiver 32.

Referring to FIGURE 4 an alternative coding arrangement is utilized wherein multiple sensing marks are used to indicate corresponding multiple variables. Thus, a film 60 has a first notch 61 formed in the edge of the film adjacent each image area for the purpose of indexing the image area in an oriented position for vertical composition.

A notch 62 is positioned longitudinally relative to each of the notches 61 as a function of film density and is cooperative with an appropriate sensing arm for pre-setting the corresponding printer components.

It will be understood that means for holding the film in a fixed position is provided during the film sensing and reproducing operation. Additionally, timing means may be operatively connected to the light receiving element 32 to control the length of time the film is exposed, and which length of time corresponds to the indexing mark on the film. There is provided suitable biasing means for moving the sensor 25 in the direction of the arrowed line 27 so as to cause sensor 25 to engage and disengage slot 23, as seen in FIGURE 1. Additionally, there is provided suitable means for advancing the film in a step by step fashion to place each individual image in the desired position to be reproduced.

It will be understood that variations and modifications may be effected without departing from the spirit and scope of a novel concept of this invention.

I claim as my invention:

1. A negative programming system for continuous roll film printing comprising:
   a roll film having a plurality of separate image areas thereon,
   a sense mark for each image area characterized by a distinctive position and angularity functioning as a permanent record of the alignment of said image area and the density of the image,
   a printing mechanism having a sensor responsive to said sense mark,
   and alignment and filter means operatively connected to said sensor and automatically conditioned by said sensor to print a picture of said image area.

2. A negative programming system for continuous roll film printing comprising:
   a film having an elongated slot indicating by its position and angularity the desired alignment and density of a corresponding image area,
   and film printing means including a spear probe sensor responsive to said slot and engaging therewith to condition said printing means for automatic operation.

3. A negative programming system for continuous roll film printing comprising:
   a roll film having a plurality of separate image areas thereon,
   and sensing means for each image area comprising a first indexing mark to regulate the vertical composition of the corresponding image area,
   and a second mark positioned longitudinally with respect to said first mark as a function of image area density.

4. A negative programming system for continuous roll film according to claim 2 further including light transmitting means, light receiving means for receiving light from said light transmitting means, and a filter secured to said probe and extending radially outwardly therefrom and positioned between said light transmitting means and said light receiving means to vary the light intensity received by said light receiving means in response to the angular position of said probe.

References Cited

UNITED STATES PATENTS 3,185,025   5/1965   Pfaff et al. _____ 95—75 XR

NORTON ANSHER, *Primary Examiner.*

GARY M. HOFFMAN, *Assistant Examiner.*